United States Patent [19]

Auerbach

[11] 4,188,426
[45] Feb. 12, 1980

[54] COLD PLASMA MODIFICATION OF ORGANIC AND INORGANIC SURFACES

[75] Inventor: Robert A. Auerbach, Fairview, Pa.

[73] Assignee: Lord Corporation, Erie, Pa.

[21] Appl. No.: 860,261

[22] Filed: Dec. 12, 1977

[51] Int. Cl.$^2$ .............................................. B05D 3/06
[52] U.S. Cl. ..................................... 427/40; 204/169; 204/170; 427/41; 428/422
[58] Field of Search ................ 427/40, 41; 204/164, 204/169, 170; 428/422

[56] References Cited

U.S. PATENT DOCUMENTS

| | | | |
|---|---|---|---|
| 3,415,683 | 12/1968 | Coffman et al. | 427/40 |
| 3,518,108 | 6/1970 | Heiss, Jr. et al. | 427/41 |
| 3,663,265 | 5/1972 | Lee et al. | 427/41 |
| 3,676,350 | 7/1972 | Wright et al. | 204/165 X |
| 3,776,762 | 12/1973 | Bernath | 427/41 |
| 3,940,506 | 2/1976 | Heinecke | 427/38 |
| 4,038,439 | 7/1977 | Gibson et al. | 427/38 |

OTHER PUBLICATIONS

IBM Technical Disclosure Bulletin, vol. 19, No. 4, Sep. 1976, p. 1400.

Primary Examiner—Michael F. Esposito
Assistant Examiner—Thurman K. Page
Attorney, Agent, or Firm—John A. Gazewood

[57] ABSTRACT

The surfaces of organic and inorganic substrates, such as polyethylene film and metals, respectively, can be modified by cold plasma deposition of difluorocarbene or trifluoromethyl radical specie generated by subjecting precursor vapor, for example, perfluorocyclobutane or hexafluoroethane, to a radio frequency electrical glow discharge.

3 Claims, 1 Drawing Figure

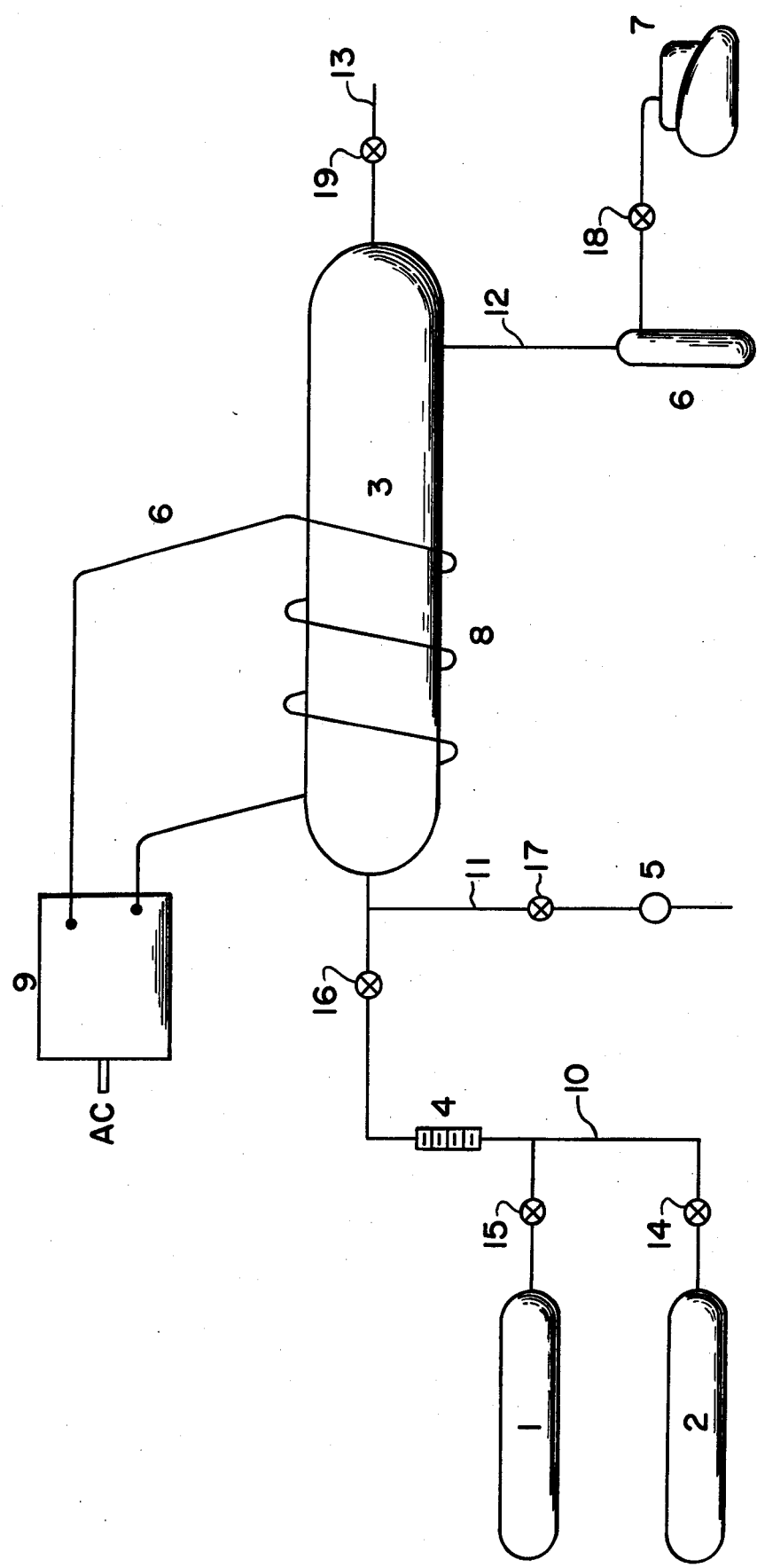

COLD PLASMA MODIFICATION OF ORGANIC AND INORGANIC SURFACES

The present invention relates to plasmas. More particularly, the invention relates to cold plasma processes adaptable to the modification of the surfaces of inorganic and organic substrates. The invention is particularly concerned with providing substrates the surface(s) of which are characterized by a low surface energy which is evidenced by a low coefficient of friction, a high degree of hydrophobicity and chemical inertness.

Plasma processes, including cold plasma processes, are well-known. Plasmas have been defined as highly reactive and energetic mixtures of ions and electrons, with properties so distinct from ordinary gases that they may be regarded as a fourth state of matter. Plasmas occur in nature: in stars, in the aurora, and other atmospheric phenomena, including lightning. Three types of man-made plasmas are distinguishable: thermal plasmas produced by atmospheric pressure arcs, which arcs have a temperature in the range between about 5000° K. to about 50,000° K., with, characteristically the kinetic energies of the constituent gas molecules, ions and electrons being in equilibrum; cold plasmas produced by glow discharges, wherein the gaseous ions and neutral gas range in temperature from ambient to several hundred degrees, while the electrons have a temperature on the order of tens of thousands degrees Kelvin; and hybrid plasmas, such as corona and ozonizer-type discharges, where numerous tiny thermal sparks are uniformly distributed throughout a large volume on non-ionized gas, and the average temperature of the entire volume is low.

Among the applications for which such man-made plasmas have been used or proposed is the modification of the surfaces of inorganic and organic substrates. Such modification is generally effected by forming a plasma of inorganic or organic gaseous species, the active specie of which are operable to modify the surface as by the formation of a polymeric coating thereon or by the grafting of such specie to the substrate surface. Quite often, the active organic or inorganic species is quite selective with respect to the substrate with which it will or can interact; and, in many instances, requires the use of a substrate which may be undesirably decomposed during the process; or requires the substrate to be at a temperature sufficient to at least soften the surfaces of the substrate; or cause the formation of excessive amounts of undesired byproducts, such as coke. For example, German DOS No. 2,060,351, which proposes to pass a trifluoromethyl species source such as hexafluoroethane and a substrate simultaneously through an electrically induced plasma; requires that the substrate constitutes iodine which is decomposed in the plasma to form iodo radicals which can combine with the trifluoromethyl radicals. In many instances, the substrate decomposes to radicals which themselves may be decomposed further, or which react preferentially with each other rather than with the trifluoromethyl radicals. For example, the use of metal halide substrates can result in a substantial plating out of the metal on the reactor walls. When an organic substrate is employed, the organo radical which is formed can itself decompose to form undesirable byproducts such as coke. Thus, in the process of German DOS No. 2,060,351, there must be employed a substrate which is capable of providing a reactive species or radical. On the other hand, Lagow et al U.S. Pat. No. 3,754,585, which also treats a substrate with trifluoromethyl active species or radical, requires that the substrate contain easily replaceable ligands such as halogen or carbonyl with the subsequent formation or trifluoromethyl-substituted compounds by substitution of the ligand on the substrate with a trifluoromethyl radical.

The present invention provides a process for the modification of organic and inorganic substrates, including metals and polymeric materials, regardless of thickness, which does not require high energy input, is operable at temperature levels significantly below those at which degradation, deformation, softening, or other adverse effects occur to the substrate, and which is independent of substrate composition.

Thus, in accordance with the present invention, there are provided processes for irreversibly modifying the surfaces of inorganic and organic substrates. More particularly, in accordance with the present invention, the surfaces of inorganic and organic substrates are irreversibly modified by contacting such surfaces with a difluorocarbene reactive species or a trifluoromethyl reactive species, said species being formed in a low energy or cold plasma, such as a glow discharge or corona discharge, whereby there is formed on said surface a fluorocarbon coating. The surfaces which are modified in accordance with this invention exhibit properties such as hydrophobicity, and lubricity, at least equivalent to those provided by conventional fluorocarbon polymers such as poly(tetrafluoroethylene). The processes of this invention are particularly suited for providing thin coatings, such as 50° to 100,000° A.

In a first embodiment of the present invention there are provided processes for modifying the surfaces of organic materials, especially organic polymeric materials comprising:

Introducing into a reaction zone a vaporized material comprising a fragmentable fluorine-containing monomer;

Subjecting said fluorine-containing monomer to an electrical glow discharge, whereby there is formed a reactive species selected from the group consisting of difluorocarbene and trifluoromethyl radical;

Contacting in said reaction zone an organic substrate disposed in said reaction zone with such reactive species; and Depositing a thin, solid continuous fluorocarbon film on said substrate. In another embodiment of the invention, there are provided processes for modifying the surfaces of inorganic substrates comprising:

Disposing within a reaction zone at least one inorganic substrate;

Introducing into such reaction zone a vaporized material comprising fragmentable fluorine-containing monomer;

Subjecting said monomer to an electrical glow discharge, whereby there is formed a plasma comprising difluorocarbene reactive species;

Contacting said substrate in said reaction zone with said reactive species; and

Depositing a thin, solid continuous fluorocarbon film on said substrate.

The present invention is based on the discovery that difluorocarbene species and trifluoromethyl species can be employed to irreversibly modify surface properties of solid surfaces, including organic solid surfaces and inorganic solid surfaces. The nature of the interaction between the two specie is not clearly understood, although it appears in each case that a polymeric coating is formed on the original surface, which coating is compositionally different from the original surface.

In the present invention, difluorocarbene species and trifluoromethyl species are formed from the fragmentation of perfluorocyclobutane and hexafluoroethane, respectively, in a cold, i.e., low temperature, plasma. In terms of physical structure, difluorocarbene can exist in the singlet state as a bent molecule with two paired electrons and an angle of about 120° between the fluorine atoms; or in the triplet state as a linear molecule with two unpaired electrons and an angle of 180° between the fluorine atoms. It is considered most likely that the reactive species which results when perfluorocyclobutane monomer gas is exposed to cold plasma conditions is triplet state difluorocarbene. Hexafluoroethane, when exposed to cold plasma conditions, undergoes bond cleavage to generate trifluoromethyl radical species, providing that the plasma is not maintained at an energy level sufficient to cause breaking of the carbon-to-fluorine bonds. In this regard, it should be noted that the carbon-to-carbon bond has an energy in the order of about 60 to 70 kilocalories, whereas the carbon-to-fluorine bond has an energy in the order of 126 to 120 kilocalories.

Both species are highly reactive electrophiles with very short half-lives. Difluorocarbene can react by insertion into a covalent bond to give a one-carbon lengthening whereby the carbene is essentially grafted onto the surface: $R—CH_3 + :CF_2 \rightarrow R—CH_2—CF_2H$; or, if double bonds are accessible to the carbene, addition may occur:

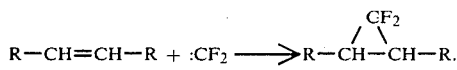

$$R—CH=CH—R + :CF_2 \longrightarrow R—\overset{\overset{\displaystyle CF_2}{\diagup\;\diagdown}}{CH}—CH—R.$$

Trifluoromethyl radical, on the other hand, can react with radical sites which are already present on the surface of the substrate by recombination: $R—CH_2\cdot + \cdot CF_3 \rightarrow R—CH_2—CF_3$, whereby trifluoromethyl groups are in effect grafted onto the substrate. If radical sites are not already present on the substrate, trifluoromethyl radical can form such radical sites on an appropriate surface by abstracting hydrogen atoms: $R—CH_3 + CF_3\cdot \rightarrow RCH_2\cdot + HCF_3$, with a loss of reactive trifluoromethyl species. The nature of the R groups is not important. Thus, it will be appreciated that trifluoromethyl species can be employed to modify only organic substrates, whereas difluorocarbene species can be employed to modify both organic substrates and inorganic substrates.

The present invention can be employed to alter the surfaces of solid polymeric materials, including natural and synthetic addition and condensation polymers. Such polymeric materials include polyolefins, such as polyethylene, polypropylene, polyisobutylene and ethylene-alpha-olefin copolymers, acrylic polymers and copolymers, such as polyacrylate, polymethylmethacrylate, polyethylacrylate; vinyl halide polymers and copolymers, such as polyvinyl chloride; polyvinyl ethers, such as polyvinyl methyl ether; polyvinylidene halides, such as polyvinylidene fluoride and polyvinylidene chloride; polyacrylonitrile, polyvinyl ketones; polyvinyl amines; polyvinyl aromatics, such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers and polyurethane rubbers; polyamides, such as Nylon 66 and polycaprolactam; polyesters, such as polyethylene terephthalate, alkyd resins; phenol-formaldehyde resins; urea-formaldehyde resins, melamine-formaldehyde resins; polycarbonates; polyoxymethylenes; polyimides; polyethers; epoxy resins, polyurethanes; wool; cotton; silk; rayon; rayon-triacetate; cellulose; cellulose acetate; cellulose butyrate; cellulose acetate-butyrate; cellophane; cellulose nitrate; cellulose propionate; cellulose ethers; and carboxymethyl cellulose.

Inorganic materials, the surfaces of which can be modified in accordance with the invention, include non-metals, such as graphite; metals, such as iron, aluminum, tin, copper and nickel; metal and other elemental oxides, such as magnesium oxide, silica, alumina and titania; minerals, such as clay, pyrite and asbestos; salts, such as sodium chloride and calcium carbonate; and such synthetic compositions as glass and refactories.

The substrates, whether organic or inorganic, can be any shape, such as continuous or particulate, porous or impervious, and large or small. The invention can be employed for altering the surfaces of crystals, powders, plates, strips, films, sheets, wire, fibers, fabrics, filaments, tubing, and cast, extruded or compressed articles, and the like.

In forming the reactive difluorocarbene species or trifluoromethyl radical reactive species; perfluorocyclobutane or hexafluoroethane monomer vapor, respectively, is passed into a low energy plasma maintained at a sufficient high energy to break the carbon-to-carbon bond. The plasma can be produced by any conventionally available means such as a radio frequency discharge, a microwave discharge or with electrodes. Suitable plasmas can be formed with a radio frequency discharge operated between about 3 to about 100 megahertz and about 1 to about 200 watts or with a microwave discharge operated between about 500 to about 4000 megahertz and about 5 to about 400 watts. The wattage considerations are based on a three inch diameter reactor and will vary with reactor size. The substrate is contacted with the reactive species entirely within the visible plasma, partially within the visible plasma, or entirely outside the visible plasma.

This invention will be more fully described with reference to the FIGURE, which is a schematic diagram of an apparatus which can be employed in the practice of the invention.

As shown in the FIGURE, there are provided inert gas reservoir 1 and monomer reservoir 2 with conduit means to deliver either or both inert gas and monomer to reactor 3. A flowmeter 4 is provided for measuring gas flow rates and a vacuum gauge 5 is provided in conduit 11 to monitor the pressure within the reactor system. Valves 14, 15, 16 and 17 are provided in conduits 10 and 11 to regulate the flow rate of monomer and inert gas to reactor 3. Prior to use, reactor 3 is evacuated by opening valve 18 to vacuum source 7. A suitable helical coil 8 is connected to a suitable radio frequency oscillator 9. A suitable radio frequency oscillator is operated at a frequency of from about 3 MHz to about 100 MHz, preferably from about 10 MHz to about 30 MHz. Substrates to be treated in accordance with the invention are placed on an appropriate rack (not shown) and disposed within the reactor 3. The substrates can be located entirely within the visible plasma region, partially within the visible plasma, or entirely outside the visible plasma. The reactor system also includes a trap 6 and vent conduit 13 and its valve 19.

The following examples are illustrative of the present invention. It should be understood that such examples are not to be construed as to unduly limit the invention.

EXAMPLE I

Employing a reactor system of the general arrangement shown in the FIGURE, aluminum, stainless steel and polyethylene film substrates are modified as follows:

The individual substrates are washed with aqueous cleaner, rinsed and immersed in deionized water in an ultrasonic cleaner for 30 minutes. The substrates are dried and placed in the plasma chamber with two of each substrate being located entirely within the plasma region and two of each substrate being located entirely outside the plasma region.

The reaction chamber is evacuated to a pressure of 10 $\mu H_g$ and the chamber is flushed three times with perfluorocyclobutane monomer gas. The monomer gas pressure is stabilized at 50 $\mu H_g$ and all valves are closed. A radio frequency plasma is induced with activation by means of a tesla coil. The plasma is maintained for two hours after which the substrates are soaked in monomer gas for 30 minutes. Distilled water contact angles are measured to determine the extent of surface modification of the several substrates. The results are reported in Table I.

TABLE I

| | Water Contact Angle, Degrees | | |
|---|---|---|---|
| Substrate | Untreated | Within Plasma | Outside Plasma |
| Aluminum | 47° 30' | 105° 45' | 111° 18' |
| Aluminum | | 102° 51' | 115° 0' |
| Stainless steel | — | 114° 30' | 116° 30' |
| Stainless steel | | 116° 0' | 120° 15' |
| Polyethylene | 97° 42' | 89° 0' | 80° 24' |
| Polyethylene | | 90° 30' | 84° 51' |

The data demonstrate the significant modification of surface properties of organic and inorganic substrates which is attained by the practice of this invention.

EXAMPLE II

Following the procedure of Example I, the surfaces of the polycarbonate, polyethylene and polyester films are contacted with trifluoromethyl radical species from a plasma of hexafluoroethane. The contact angle values are reported in Table II.

TABLE II

| | Water Contact Angles, Degrees | | |
|---|---|---|---|
| Substrate | Untreated | Within Plasma | Outside Plasma |
| Polycarbonate | 71° | 110° | — |
| Polyester | 47° | 107° | — |
| Polyethylene | 97° 42' | 116° | 106° |

The data demonstrate the significant modification of surface properties of organic substrates which is attained by the practice of this invention.

EXAMPLE III

Separate runs are made employing as monomer gas (1) perfluorocyclobutane and (2) hexafluoroethane to modify the surfaces of (1) aluminum and polyester and (2) polyester substrates, respectively. The procedure of Example I is followed, except that after placing the dried substrates in the reaction zone entirely within the plasma region and evacuating the zone to a pressure of about 10 $\mu H_g$, the reaction zone is flushed with argon gas and an argon plasma is established. The argon plasma is maintained for 30 minutes and the monomer gas (perfluorocyclobutane or hexafluoroethane) is then introduced into the plasma region. The substrates are treated with the mixed plasma for two hours. The substrates are then conditioned in the reaction zone for 30 minutes with the plasma off. Contact angle values are reported in Table III.

TABLE III

| | Reactive | Water Contact Angle, Degrees | | |
|---|---|---|---|---|
| Substrate | Species | Untreated | Argon Plasma | Mixed Plasma |
| Aluminum | .CF₃ | 51° | 33° | 60° |
| Aluminum | :CF₂ | 47° | 33° | 118° |
| Polyester | :CF₂ | 45° | 95° | 107° |
| Polyester | .CF₃ | 45° | 95° | 116° |

The data is corroborative of the results of Examples I and II.

What is claimed is:
1. A method for reducing the coefficient of friction and increasing the hydrophobicity of the surfaces of organic substrates comprising
   (a) introducing into a reaction zone a vaporized material consisting essentially of fragmentable fluorine-containing monomers;
   (b) subjecting said fluorine-containing monomer to an electrical glow discharge, whereby there is formed a reactive species wherein said fluorine-containing monomer is perfluorocyclobutane and said reactive species is difluorocarbene;
   (c) contacting in said reaction zone an organic substrate disposed in said zone with said reactive species; and
   (d) depositing a thin, solid continuous fluorocarbon film on said substrate.
2. A method for reducing the coefficient of friction and increasing the hydrophobicity of the surfaces of inorganic substrates comprising
   (a) disposing within a reaction zone at least one inorganic substrate;
   (b) introducing into such reaction zone a vaporized material consisting essentially of fragmentable fluorine-containing monomer;
   (c) subjecting said monomer to an electrical glow discharge, whereby there is formed a plasma comprising difluorocarbene reactive species;
   (d) contacting said substrate in said reaction zone with said reactive species; and
   (e) depositing a thin, solid continuous fluorocarbon film on said substrate.
3. A method according to claim 2 wherein said monomer is perfluorocyclobutane.

* * * * *